Patented Mar. 27, 1951

2,546,903

UNITED STATES PATENT OFFICE 2,546,903

PROCESS OF PRODUCING ACTIVATED CARBON

Jacque C. Morrell, Oak Park, Ill., assignor to the United States of America as represented by the Secretary of War, as trustee No Drawing. Application September 2, 1937, Serial No. 162,135

10 Claims. (Cl. 252—422)

This invention relates to the production of adsorptive or activated carbons. More particularly, it relates to an improvement in the concepts and processes of my previously issued patents for the production of adsorptive charcoals or activated carbons. Some of these patents are #1,478,985, December 25, 1923; #1,478,986, December 25, 1923; #1,478,987, December 25, 1923; #1,530,392, March 17, 1925; #1,530,393, March 17, 1925; #1,968,846, August 7, 1934, and #2,008,144, 2,008,146, 2,008,147, 2,008,148, July 16, 1935.

It is the principal object of this invention to produce structural adsorptive or activated carbon especially suited for gas mask use for the removal of toxic gases from the air breathed as well as for the removal of vapors from gases generally. The product of the invention is also highly suitable for refining liquids, e. g., organic substances, such as liquids and solutions, e. g., vegetable and animal oil solutions of sugars and the like.

In activated carbons of this type it is very important that the supporting walls of the individual particles be dense or firm and that the particle or granule itself possess the necessary structural strength required of the granular type of carbons. As examples of structural carbon are those which possess sufficient structural strength to permit their use in filter columns or beds without excessive disintegration, comparable to bone char, such as is employed in filter columns in the refining of sugar, glucose and the like, or to the activated charcoals such as cocoanut shell char used for vapor adsorption from gases, in gas masks, catalysts, etc. The structural strength of these and other types of chars is of highest importance since the life of the material depends upon its maintaining its original size and granular form. The term "structural activated carbon" as used herein further means a material which may be employed in a granular condition and implies the necessary structural strength to withstand or resist shattering, abrasion and crushing for practical purposes and to be retained in a granular or particle form of relatively large size when compared with the powdered activated carbons.

The product of the present process may be employed in various industrial processes as a decolorizing and purifying agent for the removal of color and impurities from liquids and solutions, but is more particularly to be used for the removal of vapors from gases, purification of air as in gas masks and similar uses, as a catalyst, and in general, it may be applied wherever adsorptive, decolorizing or purifying material of structural character is required. It is to be understood, of course, that the structural product may be reduced in size and may be used in a finely divided or powdered condition if so desired.

The product of the process of this invention is particularly suitable for use in gas masks to remove toxic gases from the air which is breathed and more particularly as a defense measure in time of war and in gas attacks generally. More generally the product may be used for the removal and/or recovery of vapors from gases not only for war purposes, but also in a large number of industrial processes, e. g., in the recovery of solvents from gases.

Among its other specific uses are the refining and decolorization of oils and their derivatives; the refining and decolorizing of mineral, animal and vegetable oils; for decolorizing, purifying and refining sugar solutions, syrups such as those from cane, corn, maple and sorghum, glycerine, and aqueous and non-aqueous solutions of organic and inorganic compounds; purification of water and as a deodorant. Other uses are: purification of gelatins, phenols, drugs, medicinals, pharmaceuticals, and the bleaching and purification of various crude and partly refined off-grade and off-flavored food and vegetable oils, including cottonseed, linseed, rapeseed, cocoanut, soya bean, and animal oils and fats, such as lard, fish oils, medicinal oils, paint oils, varnishes and resins, garage wastes, as a catalyst.

In a broad aspect the present invention comprises mixing finely divided carbons, to all or preferably a select portion of which a relatively easily activatible carbon of vegetable or animal origin, e. g., woodchar, which is referred to herein generally as an active carbon, may be added an activating agent comprising a metal compound, e. g., particularly the salts of various metals and also various acids, with a binder which chars on heating, or in general a mixture of carbon, an activating agent and a binder which chars on heating, compressing, molding, briquetting or extruding this mixture under a substantial pressure, subjecting the mixture to a temperature adequate to carbonize the said binder and thereafter to an activation treatment, such as treatment with steam at elevated temperatures or with other mild oxidizing agents. Preferably the molded or briquetted product is comminuted or reduced to granules of desired size before carbonizing, but there may be conditions under which it is carbonized, or partially carbonized, first and then comminuted. The product after carbonization may be acid treated and washed. The product is activated by treatment with a gas having a mild oxidizing action, e. g., steam, carbon dioxide, air (at relatively low temperatures) or mixtures. In most cases the product is subsequently treated with a solvent such as water and/or dilute acid to remove ash or inert substances therefrom. The final product of the present invention is of a granular structural form of suitable size for the aforementioned uses.

The best types of structural charcoals or carbons are those which possess a large degree of porosity of the duct or sponge type, i. e., continuous, the pores, ducts or capillaries of which are of the proper size and character, while at the same time having the necessary supporting structural or mechanical strength to withstand disintegration in the uses for which such structural chars are employed. It is these qualities that are supplied to the product by molding, compressing, briquetting or extruding under pressure. In compressing, briquetting, molding or extruding the pressure may vary from several hundred pounds per square inch or sufficient pressure only to mold the mixture to several hundred tons. Preferably pressure in excess of one ton per square inch is employed and the mixture is preferably heated to facilitate consolidation thereof. To further assist in obtaining the necessary strength while maintaining adsorption efficiency mixtures of specific types and in some cases specific proportions of carbons, as well as in some cases specific types and proportion of binders, are employed in connection with the present invention.

As a special feature of the present invention one of the carbon components of the mixture employed usually and preferably that which is most readily activated, namely the carbon of vegetable or animal origin, (e. g. woodchar), referred to as an active carbon, is especially treated with various metal salts or acids, or both, prior to admixing with the rest of the mixture. Examples of the metal salts which may be designated as heavy metal salts for present purposes are the chlorides of zinc, aluminum, iron, copper, titanium, tin and the like. Zinc and aluminum chlorides are preferred. Salts with acid radicals other than chlorides, e. g., sulphates, nitrates, and acetates may be employed, e. g., such salts as the sulphate, and nitrate of zinc has shown some improvement, although not as much as the chloride. Acids, such as those of phosphorous, e. g., ortho and pyro phosphoric acids and sulphuric acid have been used, the phosphoric acids giving better results than sulphuric under conditions of the test. It is of course to be understood that these various types of reagents are not equivalents. Oxides and other compounds, e. g., of the metals named may also be employed with some beneficial results, although not as good as the salts, and it should be understood that these are not to be construed as equivalent to the other substances and types of compounds disclosed herein nor are they equivalent to each other. In fact the individual compounds of the same element may not be equivalent to each other, e. g., zinc chloride has been found to be superior to either zinc sulphate as well as aluminum chloride under comparable conditions of the tests.

In one of its more specific aspects the invention comprises mixing a relatively active carbon (i. e., one which may be readily activated), which in general is of a non-mineral character, e. g., a vegetable char, which has been treated with or to which has been added heavy metal salt particularly metal chlorides such as those, e. g., of zinc and aluminum and the like, or in some cases with an acid like phosphoric or sulphuric with a carbon which is less active, or relatively inactive, and with a binder which chars on heating and subjecting a mixture of the same to the treatment described. A relatively inactive carbon such as coke from distillation and/or cracking of petroleum and hydrocarbon gases, coals and the like, and cokes from the destructive distillation and cracking of various tars such as coal tar, lignite tar, gas tar and retort cokes generally, etc., or from the destructive distillation of corresponding pitches, asphalts and the like, as well as coals such as anthracite, semi-anthracite, bituminous and sub-bituminous coals, and in general carbons derived from materials of a mineral character, is mixed with a more active carbon, treated with the reagents described, such as wood charcoal, particularly from hardwood, and chars such as those from straws, hulls and vegetable matter in general, including chars from various waste materials such as wood waste, shavings, the stalks, husks and cobs from corn, bagasse from sugar cane, nut hulls and shells, fruit pits, alcohol slops, waste liquors from various industries such as that from the paper industry and carbons of animal origin, such as bone black, blood char, leather char, etc., and the mixture of inactive and active carbons is mixed with a binder which chars on heating, such as a tar but preferably with pitches from various tars or asphalts and pitches from petroleum, either by straight distillation or cracking of the same, and the like. The three major components of the mixture are thus a relatively inactive carbon, in general of mineral origin, an active carbon (with added salt, etc.) and a binder which chars on heating. The coke obtained from petroleum coke either by straight distillation or cracking of petroleum or its fractions to a coke residue and/or various coals are preferred as the relatively inactive carbons. Vegetable carbons, particularly hardwood charcoals, are preferred as the relatively active carbons. Coal tar and preferably the pitches obtained from coal tar are the preferred binders.

The active carbon for present purposes may be defined further as that produced from the carbonization, particularly of vegetable and animal matter, and may include the carbons from the incomplete combustion (smoky flame) of gases wherein the carbon is deposited at relatively low temperatures, e. g., carbon black and lamp black, whereas inactive carbon may be defined, e. g., as that resulting from the coking of solid or liquid mineral carbonaceous or hydrocarbon substances such as those cited, e. g., petroleum and coal, including anthracite, bituminous coal, and tars obtained therefrom, and in general the carbon residues remaining from the destructive distillation of tars, particularly from those of mineral origin but which may include tars obtained from other sources. Because of its distinctly vegetable character, carbon obtained from peat may be considered as a vegetable carbon and an active carbon. Carbon from the destructive distillation of lignite may be considered as a mineral carbon and for purposes of the present classification may be inactive, especially with respect to the more active types cited, e. g., hardwood charcoal. Carbon from the destructive distillation of lignite may be active, however, with respect to the inactive class, e. g., cokes from petroleum and coal, and since a more desirable activated carbon from a structural or mechanical viewpoint may result from mixtures therefrom this feature is contemplated within the scope of the invention, although it is not a preferred mixture. It is to be understood that various combinations of the three major components selected from the various groups shown above are not equivalent and that the choice of the individual components will depend on the quality of product desired not only with respect to adsorption or decolorizing efficiency but also with regard to structural strength.

The mixture of carbons and binder is compressed, molded, briquetted or extruded, preferably comminuting the molded or compressed product, heating to carbonize the binder and then activating, usually by heating in the presence of steam. The product after carbonization and activation may be treated with a dilute acid such as hydrochloric acid, e. g., approximately 1 to 3 per cent, although this concentration may be varied widely, to remove undesirable ash components and may then be finally water washed.

The final product is granular in form, structural in character, and may be comminuted to a size as desired.

Some of the existing theories regarding active and inactive carbon indicate that an active carbon is essentially free from adsorbed stabilized hydrocarbons which are normally associated with it and which reduce its power of combining with other substances, and is also free from inactive carbon formed by the decomposition of hydrocarbons upon its surface at relatively high temperatures, e. g., above approximately 1000° F.

In the present invention the types of carbon which I denote and classify as active carbons are of such character that when such binders for example as coal tars or petroleum pitches and asphalts are added to them, as well as any hydrocarbons which may be associated therewith prior to the incorporation of the binder, when heated and decomposed under the existing temperatures employed for carbonization, e. g., 1200° to 1600° F. more or less, do not cause the deposition of inactive carbon which cannot be activated by the methods described herein, e. g., by steam activation or by other usual methods, and these include in general the carbons of vegetable and animal origin. On the other hand, when the carbons which I designate as inactive carbons, and these in general are of mineral origin, such as cokes from petroleum, coal, etc., or from the destructive distillation of tars therefrom, are associated with a binder such as a petroleum asphalt or coal tar pitch and heated above, e. g., 1200° F. do not readily permit the production of a satisfactorily active product for practical purposes.

One aspect of the present invention is readily illustrated by the following examples:

A mixture of petroleum coke and coal tar pitch employed in the ratio of 1.9 to 4 parts by weight of petroleum coke to one part of coal tar pitch when made up in accordance with the method described in the present invention showed a decolorizing efficiency of approximately 35 per cent on a standard raw sugar solution. When approximately 10 to 30 per cent of finely divided hardwood char was mixed with the petroleum coke, also in a finely divided condition, employing the same ratio of coal tar pitch and of the same character and processed in identically the same manner as in the first example, the decolorizing efficiency of the last product when tested in the same manner was approximately 70 to 90 per cent. The structural and mechanical strength of these products were much improved and were also greatly superior to the product made from the active carbon itself. A similar comparison was obtained when a petroleum residue, e. g., a cracked petroleum residue, was employed as the binder in both cases.

While binders like those from tars or pitches from wood or similar types from vegetable and animal sources give a relatively active product with the inactive carbons, due no doubt to the deposition of active carbon thereon, the structure or mechanical strength of these carbons is quite inferior to those wherein pitches and tars from coal and petroleum are employed.

The binders used in the present case are generally those which char on heating, preferably of a hydrocarbon character, such as pitches and tars, preferably pitches, the latter being in general the residues produced from organic substances, such as oils, tars, etc., when subjected to destructive distillation in complete or partial absence of air and to such an extent that a complete carbon residue is not produced and which may be a heavy or viscous liquid, semi-solid or solid, the latter usually softening or liquefying when heated.

Some of the common classes of pitches are: (a) Tar pitches, which include those produced from the tars of wood, bone, coal, shale, lignite, peat, straw, vegetable matter and bitumens, water gas and oil gas tars; (b) oil pitches, including the residues from distillation and cracking of animal, vegetable and petroleum oils of asphalt, paraffin, naphthene or other base; (c) pitches from destructive distillation of animal and vegetable matter, including those of stearin, palm oil, bone fat, packing house fat, garbage, sewage, grease, etc.; (d) pitches resulting from the destructive distillation of native bitumens, asphalts, asphaltites, etc. Various oils (in many cases from the tars mentioned above) may be used in conjunction with the above pitches as binders, e. g., coal tar oils, wood tar oils, petroleum oils, particularly cracked petroleum residues, etc. Preferably pitches from coal or the corresponding tars thereof and pitchy or heavy liquid residues from petroleum, both from straight distillation and cracking, are preferred, the coal tar pitches being the most desirable, especially for structure and hardness of the resulting product. Depending upon the results desired, the pitches employed may be solid, semi-solid or liquid, or combinations thereof together or with tars or oils.

In connection with the selection of the binders consideration is given to the efficiency and structural strength of the product desired. This refers to the sources of the binder as well as to its physical form, i. e., whether it is a heavy hydrocarbon fluid residue, tar, pitch or asphalt, etc.

Sufficient pitch may be present with the coke as produced, e. g., from petroleum and tars, to enable it to be molded or compressed directly without further addition of binder and the present invention contemplates the use of carbonaceous materials of this character. These types may be reduced to a finely divided condition, adding the necessary amount of wood char or other vegetable char or active char which has previously been treated with a heavy metal salt, e. g., zinc chloride or solutions of the same or an acid such as phosphoric, and then molding or compressing the mixture and following the process as described. i. e., charring and activating. If there is an excess of pitch present additional carbon of the coke type may be added and the amount of wood char or other active char in the mixture regulated accordingly. If there is insufficient pitch present additional binding material, e. g., coal tar pitch, may be added. Where sufficient pitch is present in the coke it may be necessary to add only sufficient oil or tar to the mixture to compress and mold the mixture. Coke from the cracking of petroleum and its derivatives, particularly that obtained from the cracking of an asphaltic or naphthenic base oil (although the same may apply to the coke obtained from the cracking of other types of oils), which contains approximately 15 per cent or upward of volatile matter and which has caking properties, may be of this general character. For example, with a coke from a mixed base oil of Mid-Continent or West Texas characteristics containing approximately 18 per cent of volatile matter the ratio of total carbon to pitch binder added (in this particular case coal tar pitch) was increased from approximately 2 to 1 (used for coke containing less than approximately 8 per cent volatile matter) to approximately 5 to 1, or somewhat more or less depending upon the character of the coke, e. g., 3 to 6 parts carbons to 1 part binder. The method of mixing the pitch in this particular example was either in an emulsified form such as has been heretofore described or by incorporating finely divided pitch in the carbon mixture (containing e. g., 70 to 90 per cent of the aforementioned coke and 10 to 30 per cent of wood char), employing a ratio of approximately 4 parts of the carbon mixture to 1 part of the hard pitch binder, and adding oil directly or as emulsions to the mixture. Similar results are obtained when coal is used instead of coke or in admixture therewith.

The percentage of oil required when employed in the mixture may vary somewhat depending on the type of oil and method of mixing (e. g., whether the binder is incorporated as an emulsion or direct) from approximately 25 to 60 per cent by weight of the hard pitch. When the finely divided pitch is incorporated directly into the carbon mixture without dispersing it in an aqueous medium first the oil may be added as an emulsion or direct, and in some cases the process may be reversed by adding the oil, e. g., as an emulsion to the carbon mixture and then incorporating the finely divided hard pitch binder.

It is important to note that the particles resulting from comminuting the compressed mixture containing coke or other mineral carbon, e. g., coal, active carbon and binder, may undergo little or no fluxing or bridging together when carbonized even though the coke itself in the mixture shows this tendency. This results in great saving in loss of fines if the material is crushed to size after carbonization, as fines before carbonization can be recompressed.

These specific examples are given simply by way of illustration to indicate that with increase in binding material present in the coke employed the amount of binding material to be added to the mixture of active and inactive carbon may be considerably reduced (and in some cases may even be eliminated) and the final product may be entirely satisfactory in respect to its adsorptive or decolorizing properties as well as structural strength.

It is to be pointed out particularly that the above generalizations may apply to both cracking-still and coking-still coke as well as coke from various tars such as those from coal or the coal itself, lignite and in some cases wood tar and the like. It may be well recognized that the degree of coking and the product produced in respect to volatile matter may be controllable and that coke products containing various percentages of pitch may be produced from the various raw materials cited or similar raw materials, the amount of additional binder comprising, e. g., pitch and/or tar or oil, to be added depending as described upon the amount of binder naturally present in the coke or coal as the result of the method and conditions of production of the coke itself.

A similar condition to that described above with respect to binder requirements may exist with respect to coal, particularly with bituminous coals for which the amount of binder required for the coal and active carbon mixtures will be much less than that required for anthracite coal or low volatile coke. While their use is contemplated within the scope of the invention the coals are not necessarily equivalent to the cokes.

In another specific aspect the invention comprises mixing a mineral carbon selected from a group comprising coals and cokes and containing a relatively low percentage of volatile matter, for example, cokes containing less than 10 per cent volatile matter and anthracite coal, and in some cases semi-anthracite and semi-bituminous coal, and in general a mineral carbon of non-coking characteristics, with a bituminous coal showing a distinct and marked property of coking or caking, together with an active carbon, particularly of vegetable and animal source and characteristics, which has been admixed or treated with a heavy metal salt such as zinc chloride, aluminum chloride and the like or an acid such as phosphoric, the said mixture of the various types of carbon being admixed with a binder which chars on heating, briquetting, molding, extruding or otherwise compressing the mixture, subjecting the same to a temperature adequate to char and carbonize it, preferably after comminuting, and then activating, preferably with a gas having a mild oxidizing action, for example steam, preferably subjecting the carbonized and/or activated product to the action of a dilute acid, or in general to a solvent, to remove undesirable components.

The bituminous coal of the group referred to, to be mixed with the coke or anthracite coal, etc., and the vegetable or animal carbon, serves the purpose not only as additional binding material but also determines to a great extent the structural characteristics of the finished product, although it must be borne in mind that each component serves a definite and useful purpose. In general, therefore, the mixture in this particular aspect of the invention contains a caking and/or coking coal, such as bituminous coal of the proper characteristics, a non-caking carbonaceous material comprising a coke or low volatile coal such as anthracite, and a carbon from an animal or vegetable source. Since it is evident that the bituminous coal has a very definite binding property it may be within the scope of the invention under certain conditions to employ little or no additional binder, or a small amount of binder, e. g., of the carbohydrate type of water-soluble type generally, although this is not the preferred method nor is it equivalent to those described.

In one of its more specific aspects the present invention comprises the use of an organic material, preferably in finely divided form instead of the active carbon component in the foregoing carbon mixtures after treatment of the same with the heavy metal salts or acids, e. g., zinc chloride or a solution of the same or phosphoric acid.

In contradistinction to the use of all carbon mixtures this aspect of the invention employs instead of an active carbon, (such as wood char in the mixtures already described), per se an organic material which by definition contains carbon and which also contains hydrogen, and which usually also may contain oxygen and further may contain various amounts of nitrogen, sulphur, phosphorus and elements of an ash-like character. The organic substance employed must char when heated to a sufficiently high temperature as one of its characteristics and leave a substantial residue which in turn contains a relatively large percentage of carbon.

The organic materials from which the product of the present process may be made are in general of a solid and non-fusible character and may be obtained from a large number and variety of vegetable materials, e. g., various woods, particularly hardwood such as maple, oak, hickory, birch, beech, logwood; softwoods such as poplar, pine, spruce, hemlock, cedar, straws and hulls from various grains such as oats, wheat, rye, rice, barley and the like; cornstalks and corn-cobs, bagasse, nut hulls and shells, fruit kernels and pits, oil cake and similar materials. Those substances of a carbohydrate or cellulosic character are preferred. Various animal products, for example, casein, albumen, gelatin and waste products, may also be employed, although the materials of vegetable origin are preferred. In general the organic materials selected are those which char without fusing or melting in the ordinary sense. These and similar materials will be referred to in general as the first class or primary organic materials. It is preferred that they be employed as a flour or in finely divided condition.

It is also one of the particular purposes in the present invention to utilize a second class of materials, intermediate and in some cases waste products from the treatment of organic substances or residues from partly converted organic materials instead of the primary organic materials such as slops from alcohol manufacture, vegetable oil residues, furfural residues, oak tan, acid or otherwise treated wood residues (such as is obtained in the saccharation of cellulose) and the like. These may comprise, as in the case of furfural residue, a partially carbonized material resulting from chemical treatment usually at elevated temperatures, e. g., the residues remaining after the acid treatment of corncobs, grain straws and hulls and the like to make furfural.

The third general class of organic materials employed in the present invention are those which have been partially carbonized by heat treatment or which are found in nature in a partially carbonized condition and which in general may not be considered as a carbon or be made up of a mixture which is essentially carbon.

In the following methods of processing the relatively inactive and active carbon mixture will be referred to as "carbons."

Some of the methods of accomplishing the mixing of the binder with the carbons are:

(a) The carbons may be mixed directly with an emulsified binder either as such or the carbons may be suspended in or wetted by an aqueous medium and mixed with the emulsified binder. In many cases the water contained in the emulsion will be separated from the mixture by filtration and by evaporation, or preferably by evaporation alone, but in some cases the mixture containing the emulsion may be compressed or briquetted directly before comminuting and/or heating to carbonize the binder.

(b) The carbons may be mixed with a solution of a binding material which chars on heating, separating the solvent by distillation and/or evaporation either before or after compressing the mixture as found necessary or desired. The solvent may be a relatively low boiling hydrocarbon liquid containing pitch or asphalt dissolved therein, or higher boiling solvents may be used.

(c) The carbons may be mixed with a liquid binder which chars on heating, such as a tar directly produced or similar product thereto, such as an oil added to a pitch.

(d) The carbons may be mixed with a soft pitch directly or one which is rendered fluid by heating. In some cases mixing may be facilitated under heat, i. e., the mixture is heated while mixing.

(e) The carbons may be mixed with a non-fluid (solid) pitch or other non-fluid binder which chars on heating and may also thereafter be mixed with or wetted or moistened by a fluid such as oil, tar of the character previously referred to in connection with the present invention, or other organic liquid which will dissolve, disperse or flux with the binder. It is desirable to mix the mixture of carbons and non-fluid pitch binder with an oil or tar before compressing but where no liquid is employed the mixture is heated before and/or during compression. It is to be understood, however, that it may be heated even when the wetting liquid is employed. The moistening or wetting liquid added to the mixture of carbons and the binder may also be in an emulsified state and this is especially desirable in many cases or it may be added as such direct. Oils and tars, including cracked fluid hydrocarbon residues, are preferred in this connection. The oil emulsion may be prepared as described hereinafter. In some cases the carbons may be wetted with oil either direct or in an emulsified condition and the finely divided hard pitch thereafter incorporated or various combinations of the methods described may be employed.

(f) The carbons may be mixed with a non-fluid water soluble or dispersible binding material which chars on heating, such as glucose, starch, waste sulphite liquor pitch, etc. and moistened with water, or a solution of a solid water soluble binder may be employed.

In general, the preferred methods of mixing the mixture of active and inactive carbons with the binder are (a) and (e). In (a) the water is preferably kept at minimum to permit direct evaporation and/or compression. In some cases the compressed or molded material is gently dried before carbonizing. In (e) the oil or tar is added either directly to the mixture of binder and carbon or preferably as an emulsion.

However, all of the above methods are effective, although it may be readily understood that they are not equivalents.

In all cases above the mixture is compressed, molded, briquetted or extruded under pressure, subjected to heat treatment to carbonize the binder, preferably after comminuting to proper size, and activated in most cases by steam treatment and/or other treatment. In some cases the molded product may be partly or wholly carbonized and thereafter comminuted to proper size, although it has been generally found preferable to comminute before carbonizing.

The substances added to the carbon, e. g., the heavy metal salts and/or reaction products thereof may be removed from the product after activation as well as after carbonization by treatment with a solvent, e. g., water when the material is water soluble, and an acid, e. g., hydrochloric, when the material is acid-soluble, or preferably both, i. e., acid treatment first followed by water wash. Also, in the case of mixtures with carbon containing ash naturally, e. g., wood charcoal, the product subjected to treatment with hot water and/or an acid, e. g., hydrochloric acid, finally water washing and drying causes the removal of the undesirable ash as well as added substances. In practically all cases in the present invention an acid treatment of the product is desirable. It may also be desirable to add substances which volatilize and/or react with the carbonaceous material during the treatment, such as zinc chloride, phosphoric acid and similar materials to the whole mixture comprising the carbons alone or together with the binder.

This is not however the preferred form of the invention, as much better results are obtained by adding the heavy metal salts or acids to the active carbon component, e. g., the vegetable (wood char) or animal carbons before mixing with the remaining materials.

As one example of the operation of the process, a mixture of petroleum coke and hardwood charcoal employing from 10 to 30 per cent of hardwood charcoal, preferably about 30 per cent or more in this example, in finely divided form, e. g., of approximately 20 to 200 mesh, to which finely divided hardwood charcoal has been added zinc chloride, aluminum chloride or similar heavy metal salts, or acids such as phosphoric acid, is then mixed with the binder as an emulsion or in some other form, as heretofore described. In some cases the carbon mixture may be moistened with some of the dilute casein solution. As one example, the final mixture of creosote oil, pitch and carbon may contain approximately 25 to 50 parts of oil, 100 parts of pitch and 190 parts of carbon mixture, (coke 70 to 90 per cent and wood charcoal 10 to 30 per cent), zinc chloride 10 to 30 parts all by weight, and in addition there may be present very small proportions of soda ash or sodium carbonate and casein if emulsions or suspensions are employed. These proportions and methods of preparation may vary considerably, the above example being given in connection with one particular type of structural charcoal and method of making the same. These figures are given simply as examples, although they represent desirable working proportions. Before mixing the active carbon, e. g., wood char with the other carbon components, it is treated as described with the heavy metal salt or acid, e. g., zinc chloride (preferably in solution in water, alcohol or other satisfactory solvent). The mixture is then compressed, comminuted, carbonized (acid treated in some cases), activated by treatment with a mild gaseous oxidizing agent and finally an acid and/or aqueous solvent all as described.

As a more detailed and specific example of the process the following is cited:

The components of the char are in about the following proportion:

| | | |
|---|---:|---|
| Pulverized anthracite coal[1] | 50% | by weight of carbon materials in mixture. |
| Pulverized bituminous coal (Pocahontas)[1] | 20% | |
| Pulverized wood char | 30% | |
| Pulverized coal tar pitch, 300° F. M. P. | 30% | by weight of the carbon materials used above. |
| Creosote oil | 40% | by weight of coal tar pitch. |

[1] Coke may be substituted for coal with adjustments in proportion of the mineral carbon to binder as found necessary.

The powdered wood char before mixing with the other carbon components is impregnated or otherwise treated by the addition of about 50 per cent more or less by weight of zinc chloride. The addition of the zinc chloride may be carried out in the following manner: 90 parts of zinc chloride is dissolved in 275 parts of water and this solution is gradually added and stirred into 180 parts of finely pulverized wood char all by weight. After the zinc chloride solution has been stirred into the powdered char it may form a thick slurry. This may be preferably dried and the caky material formed preferably pulverized or otherwise reduced in size. The dry impregnated wood char is then thoroughly mixed with about 120 parts of Pocahontas coal and 300 parts of anthracite coal. When the pitch binder is used in the emulsified form an emulsion of pitch comprising 188 parts of coal tar pitch suspended in 320 parts of dilute casein water (dilute solution of casein in sodium carbonate solution), to which has been added 80 parts of creosote oil emulsified with a similar amount of dilute solution of casein, is added to the above carbon mixture and thoroughly agitated. As a preferred alternative to this, the coal tar pitch in powdered condition may be added directly to the carbon and then mixed with the creosote oil either as such or in an emulsified condition. This mixture may then be dried with occasional stirring, although this may be unnecessary if only the oil is in emulsified condition when added.

Where the materials are mixed direct without suspension of the pitch or oil in water, the dry carbon materials (after adding the heavy metal salt, e. g., zinc chloride to the wood char) are first mixed together. The pulverized pitch is then added and as the agitation is started creosote oil is sprayed into the mixture undergoing agitation. No drying is necessary in these circumstances.

The mixture is heated to approximately 275° F. more or less for briquetting and forms a dense hard briquette which gives a clean fracture on comminuting. The briquettes are broken up and screened to meet requirements. Fines are rebriquetted without difficulty, and are preferably mixed with fresh material being briquetted in the proportion formed in the comminuting operation.

The comminuted material is carbonized at a temperature of approximately 1500° F. more or less. After carbonization, the material is preferably treated with a dilute hydrochloric acid solution, and then water washed. The granular material is then activated at approximately 1700° F. more or less and steam added in the ratio of about 1.0 to 2 parts by weight or more of carbon charged to the activating retort, depending on the degree of activation desired. The amount of acid and water required for the subsequent treatment may also be about the same as that used after carbonization. The subsequent drying may be at about 300° F.

Tests where the intermediate acid treatment was omitted indicated that the product might be less active. Other tests where the metal salt, for example, zinc chloride was added dry and ground into the wood char appeared to give a final product that was less effective than the product above described.

The procedure in using other salts, including aluminum and ferric chlorides and similar chlorides such as titanium and tin was parallel throughout to that described above for zinc chloride. The product was however not as desirable as the product obtained with zinc chloride impregnation of the wood char or other active carbon component, but was much more effective than when the salt treatment was eliminated. The nature of the solvent used to dissolve the salt for impregnating the wood char or other active carbon apparently did not appear to be a factor inasmuch as similar results were obtained when using water and ethyl alcohol as solvents for the aluminum chloride providing the amounts impregnated are controlled. Where ferric chloride was used a product was obtained which corresponded approximately to the product from aluminum chloride treatment. Where phosphoric acid was used, the final product was hard and was approximately 75 per cent as effective as the zinc chloride-treated product described above. In a preparation using zinc sulfate to impregnate the wood char component, a product was obtained only about half as active as the zinc chloride product first described above but very much more active than without the addition of the zinc salt.

Good results have been obtained by treating the finely divided wood charcoal (or other active or non-mineral carbons) as described with solutions of zinc chloride and/or other metallic salts as well as acidic substances and then mixing these with the coke and/or coal or other carbon of mineral character and the hard pitch in practically dry condition, thereafter adding the oil per se and thoroughly mixing therewith, or adding and mixing the oil during the mixing operation of the dry materials. The above procedure may also be followed and the oil added in the form of an emulsion.

Where a pitch emulsion is employed as a binder it is preferably prepared as follows: A pitch suspension may be prepared by adding an equal part by weight of a solution of casein in alkali, e. g., sodium carbonate, to the finely divided pitch and stirring and/or grinding. To this is added an emulsion of oil, preferably from coal tar, e. g., creosote or anthracene oil prepared by emulsifying the oil in an equal part of the aforementioned casein solution. In preparing this emulsion the oil may be added slowly to the casein solution and vigorously agitated during or between additions until the required quantity of oil has been added. The oil emulsion is then mixed with the pitch suspension, the resulting system containing a stable emulsion of soft pitch in the proportion, e. g., of 25 to 60 parts of the creosote oil for each 100 parts of the hard pitch. It may be desirable to add to the emulsion a soft pitch prepared as described a small amount of ammonium tannate solution (a solution of tannic acid containing a small amount of ammonia) to stabilize the same.

For other mixtures of carbonaceous materials and binders to which the underlying principles of this invention may be employed, e. g., coke or anthracite coal, bituminous coal and hardwood charcoal employing from 15 to 30 per cent of bituminous coal, 10 to 30 per cent or more of hardwood charcoal, preferably around 30 per cent in this particular example, and the remainder coke or anthracite coal, all preferably in finely divided form, e. g., of approximately 50 and finer than 200 mesh, is then mixed with the binder. As one example, the final mixture of creosote oil pitch and carbons may contain approximately 25 to 50 parts of oil, 100 parts of pitch and 350 parts of carbon mixture (coke or anthracite coal 50 per cent, bituminous coal 20 per cent, and wood charcoal 30 per cent) by weight. These proportions may vary considerably. The proportions of carbon mixture (coke, coal and wood char) may generally vary from approximately 160 to 600 parts relative to the pitch, depending upon the amount of volatile matter and/or pitch present originally in the coal or coke and other factors, e. g., for a completely devolatilized coke, e. g., 2.5 to 4 parts of carbon mixture to 1 part of pitch may be employed, and for a coke containing a substantial per cent of volatile matter, e. g., from a cracking operation, 5 parts of carbon mixture to one part of pitch may be employed. The per cent of bituminous coal when present in the carbon mixture will also determine the ratio of carbon mixture to pitch binder so that the figures are given simply as examples.

Where emulsions or suspensions are employed it is not necessary that the mixture be completely dry as the presence of small amounts of water in some cases facilitates molding or briquetting. It is preferred that the mixture of binder either in emulsified form or mixed direct and carbon be compressed or molded directly, the amount of water in such cases being kept to a minimum. The mixture, preferably while warm or heated, is compressed, molded or briquetted, preferably under pressures, e. g., I have found pressures of 2.5 tons per square inch quite satisfactory as a working pressure, although any suitable pressure which gives the desired results will suffice. The compressed material is then carbonized. Preferably the compressed or molded product or briquettes are first crushed to the desired size before carbonization. In some cases they may be ground to, e. g., 6 or 8 mesh and upwards, carbonized and then subsequently further treated, or they may be reduced to larger or smaller size if desired for further treatment. If used for filtering some liquids the product prior to carbonizing may be reduced to smaller size as desired, e. g., 10 mesh to 20 mesh and smaller.

For gas mask use somewhat larger average sizes are employed. It is desirable to avoid losses in going through several grinding operations, such as fines having less or little value. Fines accumulating before carbonizing may be recompressed again. In some cases the molded material is carbonized directly and then comminuted or crushed and/or ground to proper size. It is preferred, however, that the molded product be comminuted before carbonizing.

While I have described in detail the preparation of a mixture by one of the methods employed in the present invention in preparing the mixture of carbons and binder, it is to be understood that other methods, including those previously described, may be employed, e. g., the carbons (e. g., coke, bituminous coal and wood char) may be mixed directly with a soft pitch binder (preferably under heat) or a solution thereof, or with a finely divided hard pitch binder alone or by the addition later of a small amount of oil or tar or other solvent for the binder and in various combinations, and in general with a binder which chars on heating, and subsequently compressed and subjected to carbonization and/or to the other treatments described in accordance with the process.

In the above examples, the petroleum (or cokes generally) or anthracite coal serves essentially to permit a product to be produced of good structure. The bituminous coal when used assists both in structure and binding properties while the wood char or other active carbon, e. g., of vegetable or animal origin treated with the metal salt or acid, as described, contributes largely and in fact furnishes the basis for the required adsorptive and decolorizing efficiency, although it is to be understood that the whole mixture is cooperative in all of the properties and functions of the finished product.

Coke from coal, or from the carbonization of pitches, tars and the like, in general of mineral origin as well as anthracite or semi-anthracite coal, may also be employed generally to replace the petroleum coke component, although they are not to be construed as complete equivalents.

In the carbonization operation, heating schedules from twenty to sixty minutes at temperatures varying from 1200° F. to 1600° F. or higher have been found satisfactory. Generally speaking, carbonization in thin layers is preferred. The use of a continuous rotary type of retort has been found satisfactory both for carbonizing and activating with steam. The principal object here is to heat the material uniformly and prevent formation of secondary inactive carbon. After the carbonization treatment the product is subjected to a second heat treatment in the presence of steam at temperatures between approximately 1500° F. and 1800° F. for about twenty minutes to two hours or more. In some cases it has been found desirable to introduce steam into the charge while undergoing carbonization.

While I have described the preparation of a structural activated char employing certain mixtures and conditions, it is to be understood that these examples are merely for illustrative purposes, as many possible combinations between the various classes of carbons and binder material that char on heating, such as those shown or mixtures, may be made.

In general, the carbons may be distinguished from the binders in that the carbons are not liquefied nor do they soften by relatively low temperature heat treatment and usually the amount of volatile matter is less than non-volatile, whereas generally the binders do soften or liquefy by heat treatment and are usually higher in volatile matter. However, the carbons may contain considerable volatile and/or binding matter on the one hand and may undergo some caking when heated to high temperatures, and the binders may contain considerable free carbon on the other. The binders may be materials of a pitchy, asphaltic, resinous or similar characteristic, which may be in a non-fluid or solid state, or which may be of such melting point characteristics as to conform to the shape of the containing vessel. Pitches, particularly those obtained from coal and wood tars and similar tars, are preferred as binders, although those from other tars and petroleum may be employed.

It is usually preferred that the carbon base be ground to 200 mesh or above, although approximately 50 mesh and above may be found satisfactory.

Apparently the carbonization of the binder while in contact with the active carbon present in the mixture causes the formation of an active carbon or one which is easily rendered active.

Various mixtures of carbon bases, such as coke from various oils, tars or pitches, preferably from petroleum, coal, etc., and wood charcoal or chars from vegetable and animal sources generally, e. g., hardwood charcoal, have been used, the proportions varying quite widely depending upon the materials used and the results desired. The mechanical structure improves within limits with the lower percentages of active carbon; however, the activity of the finished product must be considered in determining the minimum percentage of active carbon to be employed. The ratio of carbon base to pitch (on the basis of hard pitch) may be 1.5 to 6 of carbons to 1 of pitch. In general, as the volatile matter in the pitch changes its relative proportion is changed within certain limits.

The proportions of various materials are given as examples and they may vary more widely depending upon the results desired, e. g., a larger proportion or ratio of carbons to binder may be employed in some cases.

I have found that certain mixtures produce superior results with respect to structural strength or resistance to shattering, abrasion, attrition and the like of the granular product, e. g., when employing cokes or anthracite coal, bituminous coal and a vegetable carbon, e. g., hardwood char as a carbon base, not only the adsorptive properties of the product are improved but the structural strength of the product is very greatly improved. As a specific example of such a mixture may be cited: petroleum coke, 40 to 60 parts by weight; bituminous coal, 20 to 30 parts; hardwood charcoal, 10 to 30 parts. For coke or anthracite coal without bituminous coal 70 to 90 parts may be employed. The binder ratio may be less than 2 to 1 for low volatile coke, as in the previous case, and higher than 4 to 1 for high volatile cokes, preferably employing coal tar pitch as the binder, which produces a product of superior structural strength. This is merely an additional example of proportions that may be used.

The binder in the above cases may be incorporated in the mixture in any of the manners described, e. g., in an emulsified state or preferably as a finely divided hard pitch and mixed afterward with an oil or tar which may be emulsified or added direct, as described above.

As a specific example of adsorptive results obtained on a raw corn sugar solution to remove color the following are given:

| Sample No. | Per Cent Coal | | Per Cent Wood Char | Ratio carbons to Coal Tar Pitch Binder | Product | |
|---|---|---|---|---|---|---|
| | (Low volatile) Anthracite | (Bituminous) Pocahontas | | | Per Cent Decolorizing Raw Corn Sugar Solution | Structural Strength |
| 1 | 60 | 20 | 20 | 4:1 | 88 | Very good. |
| 2 | 50 | 25 | 25 | 4:1 | 89 | Do. |
| 3 [1] | 50 | 25 | 30 | 4:1 | 98 | Do. |
| 4 | Standard Bone Char | | | | 65 | |

[1] Wood char treated with zinc chloride solution as described before mixing with other components. For decolorizing Sample No. 3 will be equal to several times the value of Nos. 1 and 2 on a weight basis and these in turn will be more than twice the bone char. For gas adsorption Sample No. 3 is about 6 to 10 times as efficient as Samples Nos. 1 and 2 wherein no metal salt treatment was employed. The bone char had no measurable gas adsorptive properties. The proportion of oil employed (in emulsified form) in the above mixtures varied from 25 to 50 per cent of the pitch employed. When wood tar pitch was substituted for coal tar pitch the activity was improved, but the structural strength was not as good.

The products of the process were regenerated numerous times after use with very little depreciation in structural strength and activity.

Variations in percentages and amounts of the various components changed the balance between structure and the activity to a varying extent.

When coke, e. g., petroleum coke of low volatile content and coke from the coking of coal, tar, pitches and the like are employed instead of the anthracite coal, similar though not equivalent results are obtained. Binders from petroleum, e. g., pitches, asphalts, etc., from straight run and cracked oils may also be employed.

Other vegetable chars also give good results when replacing hardwood char, although the latter is usually preferred.

By "binder ratio" is meant the amount of carbon to pitch employed, e. g., 3 to 1 means 3 parts by weight of carbon to 1 part pitch.

Results comparable to those shown may be obtained by the other modifications described herein, but the method used in the specific cases is preferred.

As an example of the results obtained in the adsorption of gas from air, the standard accelerated chlorpicrin test was made upon a sample prepared as described in the specific example wherein the following percentages of materials were employed: anthracite coal, 50%, bituminous coal 20%, wood char 30%, treated by mixing therewith an equal weight of zinc chloride in aqueous solution, coal tar pitch (300° F. M. P.) 30%, all in finely divided condition. Creosote oil was used in the mixture and the wood char was treated as described, and the details of preparation were as described above for the entire mixture.

special requirements for life and hardness. It is to be understood that the methods and various modifications thereof described above, or in general in the foregoing, are not to be considered as equivalents in the sense of quality of product or results produced, the particular method and combinations chosen depending upon the raw materials employed and the results desired.

The term "carbon" as herein employed is intended to cover pure carbon as well as a mixture of natural or artificial origin containing a high percentage of carbon. This includes the various charcoals and carbons of animal, vegetable or mineral origin. By the term "heavy metal salt," as used in the specifications and claims herein, is meant the salts of metals other than those of the alkalies or alkaline earths. By the term "compressing" in the claims is meant subjecting the mixture to pressure of any form, e. g., molding, briquetting, extruding, rolling and the like.

The term "non-reactive binder" as used in the claims refers to a binder which does not normally undergo chemical reaction with the other components of the mixture of which it is a part.

The above examples are given for illustrative purposes only, and it may be readily recognized that many combinations of carbon base and binder may be employed and many mixtures of various carbon bases may be employed and combined with various types of binders, either alone or in admixture. It may be also recognized that the conditions of treatment, such as temperatures of carbonizing and activation, may vary, all within wide limits. Also, that in regard to the quality of the resulting product, the extent of decolorization or refining may be much higher than that shown in the table, depending on conditions of the test, the amount and kind of material to be treated, and the particular product being tested. Hence, the specific examples are

| Character of Test | Observed Result | Required by Specification for Gas Masks |
|---|---|---|
| Life in min. vs. 47 mg. chlorpicrin per liter of dry air flowing at 1000 cc./min./sq. cm. Cross sectional area of dry No. 12-16 sieve carbon 10 cm. deep. | 37-42 min | At least 35 min. |
| Hardness number of No. 12-16 size carbon | 85 | At least 65. |
| Size distribution on U. S. Standard sieves | Larger than #6 size, 0% | Not over 5%. |
| | 6-8 size, 21.7% | Not over 20% nor less than 10%. |
| | 8-12 size, 36.8% | Not less than 20%. |
| | 12-16 size, 24.5% | Not less than 25%. |
| | 16-20 size, 13.3% | Not less than 15%. |
| | Finer than 20 size, 3.7% | Not more than 8%. |

The data show that the product meets the tests, particularly in respect of the rigid and special requirements for life and hardness. not to be considered as limitations upon the broad scope and spirit of the invention.

I claim as my invention:

1. A process for the production of structural activated carbon suitable for adsorptive and refining purposes which comprises adding zinc chloride to a carbon comprising a vegetable char and thereafter mixing the said carbon comprising a vegetable char with mineral carbon of the class consisting of coals and cokes and with a binder which chars on heating, compressing the mixture under substantial pressure, subjecting the compressed product to a temperature adequate to carbonize and to char the binder therein, activating the resulting product by heating in the presence of a gas having an activating action and subjecting the charred and the activated product to the action of a solvent to remove undesirable substances.

2. A process for the production of structural activated carbon suitable for adsorptive and refining purposes which comprises adding zinc chloride to carbon comprising a wood char and thereafter mixing the said carbon comprising a wood char with mineral carbon of the class consisting of coals and cokes with a binder which chars on heating, compressing the mixture under substantial pressure, comminuting the compressed material and subjecting the comminuted product to a temperature adequate to carbonize and to char the binder therein, activating the resulting product by heating in the presence of steam and subjecting the charred and the activated product to the action of an acid to remove undesirable impurities.

3. A process for the production of structural activated carbon suitable for adsorptive and refining purposes which comprises adding zinc chloride to finely divided wood and thereafter mixing the said finely divided wood with mineral carbon selected from the class consisting of coals and cokes and with a binder which chars on heating, compressing the mixture under substantial pressure, subjecting the compressed material to a temperature adequate to carbonize and to char said wood and binder therein, activating the resulting product in the presence of steam, and subjecting the charred and the activated product to the action of an acid to remove undesirable impurities.

4. A process for the production of structural activated carbon suitable for adsorptive and refining purposes, which comprises adding a solution of zinc chloride to a carbon comprising a finely divided hardwood char, drying the mixture and thereafter mixing the said carbon comprising the hard-wood char with mineral carbon of the class consisting of coals and cokes and with a binder which chars on heating, compressing the mixture under substantial pressure, comminuting the compressed material, and subjecting the comminuted product to a temperature adequate to carbonize and to char the binder therein, activating the resulting product by heating in the presence of an activating gas, and subjecting the charred and activated product to the action of a solvent to remove undesirable impurities.

5. A process for the production of structural activated carbon suitable for adsorptive and refining purposes which comprises adding a solution of zinc chloride to a carbon comprising a wood char, drying the mixture and thereafter mixing about 10 to 30% of the said carbon comprising the wood char with about 90 to 70% of mineral carbon of the class consisting of coals and cokes and with a binder which chars on heating, compressing the mixture under substantial pressure, comminuting the compressed material, and subjecting the comminuted product to a temperature adequate to carbonize and to char the binder therein, activating the resulting product by heating in the presence of steam and subjecting the charred and activated product to the action of an acid to remove undesirable impurities.

6. A process for the production of structural activated carbon suitable for adsorptive and refining purposes which comprises adding phosphoric acid to a carbon comprising a wood char and thereafter mixing the said carbon comprising a wood char with a mineral carbon of the class consisting of coals and cokes and with a binder which chars on heating, compressing the mixture under substantial pressure, comminuting the compressed material and subjecting the comminuted product to a temperature adequate to carbonize and to char the binder therein, activating the resulting product by heating in the presence of steam.

7. A process for the production of structural activated carbon adapted for adsorption of harmful gases from air to be breathed comprising treating a comminuted vegetable char with a solution of zinc chloride, then mixing the comminuted vegetable char with comminuted mineral carbons of the class consisting of coals and cokes and a binder which chars on heating, compressing the mixture under a pressure sufficient to consolidate the same, charring the binder by heating the mixture and activating the resulting product by subjecting to the action of an activating substance at an activating temperature.

8. A process for the production of structural activated carbon adapted for adsorption of harmful gases from air to be breathed comprising treating a comminuted wood char with a solution of zinc chloride, then mixing the comminuted wood char with a comminuted mineral carbon of the class consisting of coals and cokes and a binder which chars on heating, compressing the mixture under a pressure sufficient to consolidate the same, charring the binder by heating the mixture and activating the resulting product by subjecting to the action of an activating substance at an activating temperature.

9. A process for the production of structural activated carbon adapted for adsorption of harmful gases from air to be breathed comprising treating a comminuted organic material with a solution of zinc chloride, then mixing the comminuted organic material with comminuted mineral carbons of the class consisting of coals and cokes and a binder which chars on heating, compressing the mixture under a pressure sufficient to consolidate the same, charring the binder by heating the mixture and activating the resulting product by subjecting to the action of an activating substance at an activating temperature.

10. A process for the production of structural activated carbon for adsorptive and refining purposes which comprises adding an activating material selected from the group consisting of zinc chloride and phosphoric acid to a carbon comprising a vegetable char and thereafter mixing the said carbon comprising a vegetable char with mineral carbon of the class consisting of coals and cokes and with a binder which chars on heating, compressing the mixture under substantial pressure, subjecting the compressed product to a temperature adequate to carbonize and to char the binder therein, activating the resulting product by heating in the presence of a gas having an activating action and subjecting the charred and activated product to the action of a solvent to remove undesirable substances.

JACQUE C. MORRELL.

REFERENCES CITED

The following references are of record in the file of this patent:

UNITED STATES PATENTS

| Number | Name | Date |
|---|---|---|
| 1,610,399 | Urbain | Dec. 14, 1926 |
| 2,008,144 | Morrell | July 16, 1935 |
| 2,008,146 | Morrell | July 16, 1935 |
| 2,083,303 | Krczil | June 8, 1937 |

FOREIGN PATENTS

| Number | Country | Date |
|---|---|---|
| 642,360 | France | Aug. 28, 1928 |